F. M. PIERCE.
GUIDE PIN FOR TIRE UNWRAPPING MACHINES.
APPLICATION FILED APR. 29, 1920.
1,433,648.
Patented Oct. 31, 1922.
2 SHEETS—SHEET 1.
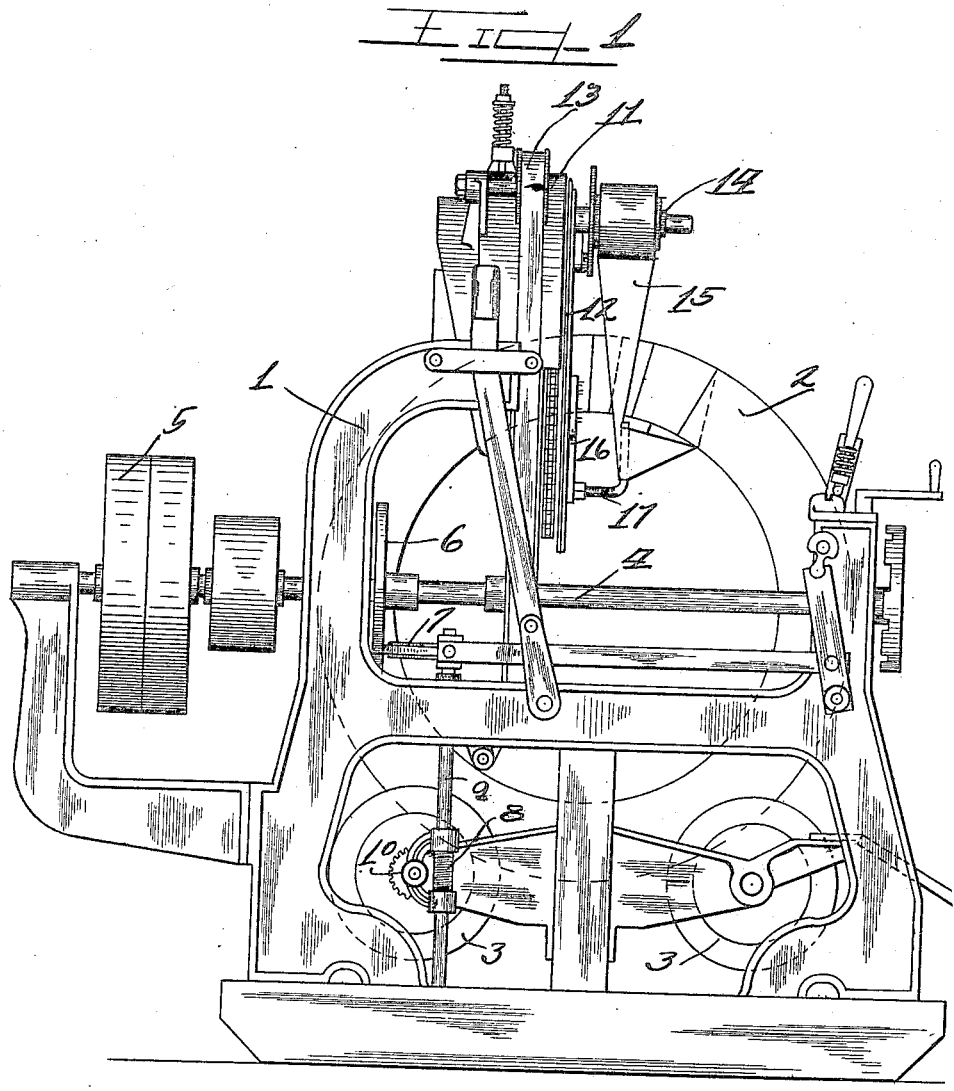

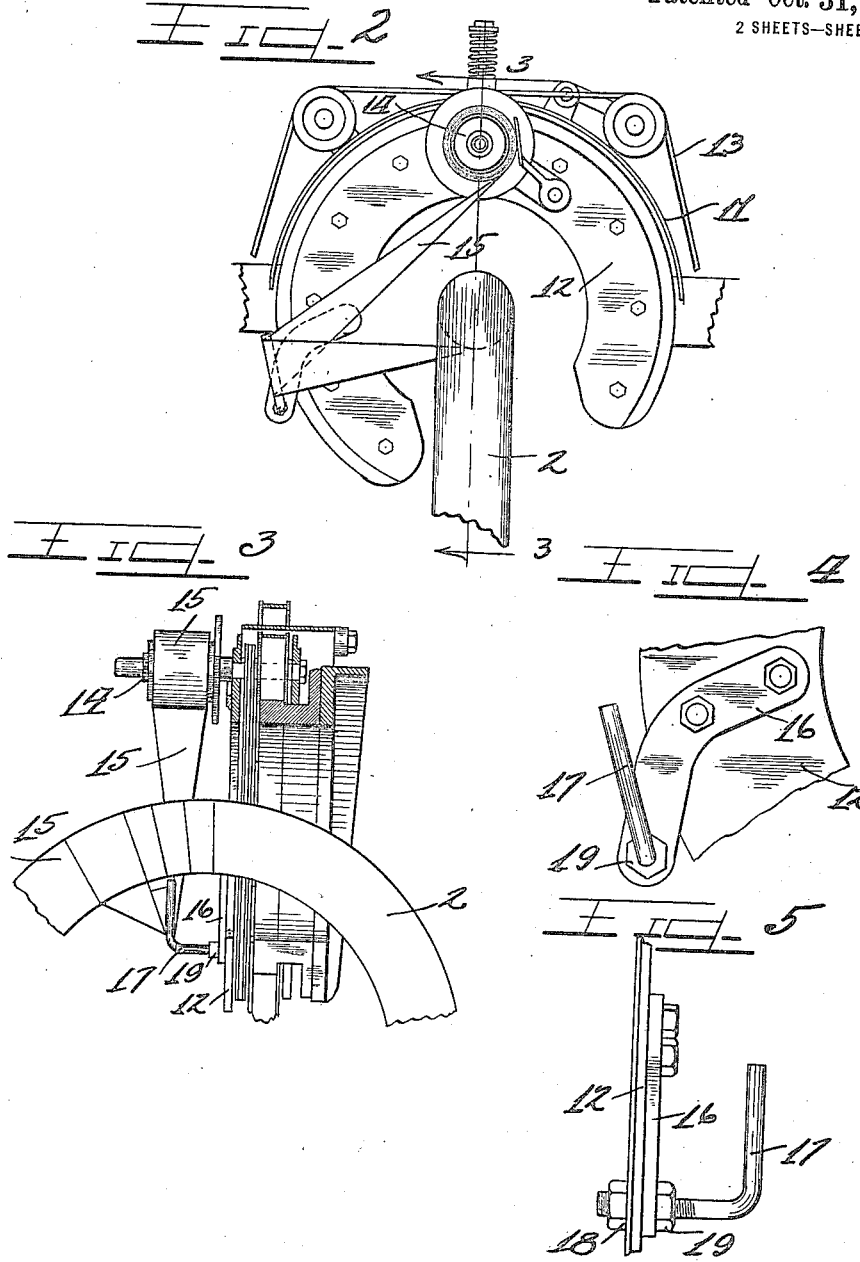

Patented Oct. 31, 1922.

1,433,648

UNITED STATES PATENT OFFICE.

FRANK M. PIERCE, OF CHICAGO, ILLINOIS.

GUIDE PIN FOR TIRE-UNWRAPPING MACHINES.

Application filed April 29, 1920. Serial No. 377,532.

*To all whom it may concern:*

Be it known that I, FRANK M. PIERCE, a citizen of the United States, and a resident of the city of Chicago, in the county of Cook and State of Illinois, have invented certain new and useful Improvements in Guide Pins for Tire-Unwrapping Machines; and I do hereby declare that the following is a full, clear, and exact description of the same, reference being had to the accompanying drawings and to the numerals of reference marked thereon, which form a part of this specification.

This invention relates to a guide pin for a tire unwrapping machine, and relates particularly to a device adapted to engage and guide a strip of canvas bandage as it is being unwrapped from the tire. In the construction of tires or casings the tire is built up on a suitable mould until of the desired configuration, and then an investing wrapper of wet canvas is wound upon the same to firmly bind the various layers of material together, after which the same is placed in the vulcanizer until the various layers are vulcanized into a homogeneous mass when the investing layer or bandage of canvas is unwound from the tire by the tire-unwrapping machine. The investing layers or bandages of canvas are used in a number of wrapping operations and difficulty has been experienced in the tire-unwrapping machine hithereo used in obtaining a tightly wound, well-aligned, roll of investing material which is adapted to be used in a subsequent winding or wrapping operation without rewinding the same. Exact alignment of the reel for the roll of material and the tire is required if the roll of material unwrapped is to be used in subsequent wrapping without rewinding the same.

It is therefore an object of this invention to provide a guide adapted to engage a strip of investing material which is being unwound by a tire-unwrapping machine and so guide said strip of material that a perfectly aligned roll thereof will be formed irrespective within a large range of the relative positions of the tire and the shuttle of the machine.

It is also an important object of this invention to provide a guide pin for a tire-unwrapping machine adapted to engage and guide material being unwrapped by the machine in order that a perfectly aligned roll thereof, which may be used in a subsequent wrapping operation, may be formed.

Other and further important objects of the invention will be apparent from the disclosures in the specification and the accompanying drawings.

The invention (in a preferred form) is shown in the drawings and hereinafter more fully described.

On the drawings:

Figure 1 is a side elevation of a tire-unwrapping machine equipped with the guide pin of this invention.

Figure 2 is a fragmentary elevation of the shuttle of a tire-unwrapping machine showing the operation of the guide pin.

Figure 3 is a section on line 3—3 of Figure 2 with parts omitted.

Figure 4 is a front elevation of the guide pin.

Figure 5 is a side elevation thereof.

As shown on the drawings:

The device of this invention is adapted to be used on any commercial tire-unwrapping machine and as the tire unwrapping machine proper does not form a part of this invention, it will only be described in general terms herein. The machine is sup-supported by a cast frame 1, and the tire casing 2, which is to be unwrapped is supported in the frame 1 and rotated by the rollers 3, which are adjustably mounted in said frame. A drive shaft 4 is journaled in the frame 1 and said drive shaft is rotated from an external source of power such as a belt driving the pulley 5. The rolls 3 are driven by the engagement of the friction plate 6 on the shaft 4 with the friction plate 7 on the vertical shaft 9, whereby the worm 8 on said shaft 9 drives a worm gear 10, which is secured to and rotates the shaft of the roll 3. A shuttle housing 11 is secured to the frame 1 in a plane substantially perpendicular to the plane of the tire casing 2. The incomplete annular shuttle 12 is rotatably mounted in said housing 11 and is rotated therein by the belt 13, which is driven from the drive shaft 4.

A bandage reel 14 is rotatably mounted on the shuttle 12, which is rotated by the belt 13 and is positively rotated by a chain drive from said shuttle. In unwrapping the tire the strip of bandage or investing material 15 is secured to the periphery of the reel 14 and the relative rotation of the shuttle 12 and the reel 14 and the tire casing 2 causes said strip of investing material to be unwrapped from said tire casing onto the reel 14.

It is clearly apparent from the foregoing description that unless perfect alignment exists between the reel 14 and the tire casing 2 it will be impossible to form a perfect roll of investing material on said reel 14. Due to difficulties in relative speed regulation and in positioning the casing 2, very skillful operation of the machine is required in order to obtain this perfect alignment.

The guide pin of this invention is provided in order that perfect rolls of investing material 15 may be formed on the reel 14 irrespective within a wide range of the alignment of the casing 2 in the shuttle 12 or of the relative speeds of rotation thereof. Said guide pin is mounted on a bracket 16, which is secured to the shuttle 12 and ordinarily comprises the cylindrical and angularly bent rods 17, the horizontal portion of which is threaded and engaged through the bracket 16 and adjustably secured to said bracket by means of nuts 18 and 19 engaged on said threaded portion whereby the device may be accurately centered for different widths of bandages.

The strip of investing material is engaged around said guide pin 17, as clearly shown in Figures 1, 2 and 3, and it is apparent that by this arrangement the portion of the strip 15 which is being wound on the reel 14 is always perfectly aligned therewith irrespective within a wide range of the alignment between the tire casing 2 and said reel 14. Of course a roller may be mounted on the pin 17 if so desired in order to diminish the friction between said pin and the strip of investing material.

I am aware that numerous details of construction may be varied through a wide range without departing from the principles of this invention, and I therefore do not purpose limiting the patent granted otherwise than necessitated by the prior art.

I claim as my invention:

1. The combination with a shuttle, of a pin for guiding material carried thereby, comprising a portion projecting outwardly from the shuttle, and a second portion supported on said outwardly projecting portion and mounted in a plane which is at an angle of not more than 90° with the plane of the shuttle.

2. The combination with a shuttle, of a pin for guiding material carried thereby, said pin being rotatable with the shuttle and having the guiding portion thereon mounted in a plane which is at an angle of not more than 90° with the plane of the shuttle.

3. The combination in a tire unwrapping machine of a shuttle and a guide pin thereon comprising a rod bent at an angle to afford a supporting portion and a wrapping material guiding portion.

4. The combination in a tire unwrapping machine of a rotatable shuttle, a rotatable reel, and an angle guide pin secured to the shuttle for guiding material wound on the reel.

5. In a device of the class described the combination with a rotatable shuttle having material receiving means thereon, of guiding means on the shuttle adapted to engage material wound on said receiving means the material engaging portion of said guiding means being in a plane substantially parallel to the plane of the shuttle.

6. The combination in a tire-unwrapping machine of a rotatable shuttle, a rotatable reel, a bracket secured on the shuttle, and an angle guide pin secured in the bracket.

7. The combination in a tire-unwrapping machine of a rotatable shuttle, a rotatable reel, a bracket secured on the shuttle, and a guide pin adjustably secured in the bracket.

In testimony whereof I have hereunto subscribed my name in the presence of two subscribing witnesses.

FRANK M. PIERCE.

Witnesses:
 CARLTON HILL,
 EARL M. HARDINE.